(12) United States Patent
Zaretsky et al.

(10) Patent No.: US 7,230,520 B2
(45) Date of Patent: Jun. 12, 2007

(54) METHOD AND APPARATUS FOR RF ACCESS TO SYSTEM ID AND FAULT INFORMATION

(75) Inventors: Lee Zaretsky, Austin, TX (US); Roman Szeszycki, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 366 days.

(21) Appl. No.: 10/838,066

(22) Filed: May 3, 2004

(65) Prior Publication Data
US 2005/0242925 A1    Nov. 3, 2005

(51) Int. Cl.
    *H04Q 1/00*    (2006.01)
(52) U.S. Cl. .................. 340/10.1; 340/572.1
(58) Field of Classification Search .......... 340/10.1, 340/10.41, 5.61, 5.74, 539.24, 572.1
    See application file for complete search history.

(56) References Cited

U.S. PATENT DOCUMENTS

| | | | |
|---|---|---|---|
| 5,623,666 A | 4/1997 | Pike et al. .................. 395/616 |
| 5,629,981 A | 5/1997 | Nerlikar ..................... 380/25 |
| 5,959,530 A * | 9/1999 | Lupien et al. .............. 340/5.61 |
| 6,249,227 B1 | 6/2001 | Brady et al. ............. 340/572.1 |
| 6,400,272 B1 | 6/2002 | Holtzman et al. ....... 340/572.1 |
| 6,424,727 B1 | 7/2002 | Musgrave et al. .......... 382/117 |
| 6,445,969 B1 | 9/2002 | Kenney et al. ............. 700/108 |
| 6,457,038 B1 | 9/2002 | Defosse ..................... 709/200 |
| 6,491,217 B2 | 12/2002 | Catan .......................... 235/375 |
| 6,509,828 B2 | 1/2003 | Bolavage et al. .......... 340/10.1 |
| 6,525,648 B1 * | 2/2003 | Kubler et al. ............ 340/572.1 |
| 6,533,168 B1 | 3/2003 | Ching ......................... 235/375 |
| 6,539,422 B1 | 3/2003 | Hunt et al. ................. 709/217 |
| 6,549,064 B2 | 4/2003 | Bandy et al. ............... 327/536 |
| 6,584,449 B1 | 6/2003 | Otto ............................ 705/20 |
| 6,587,755 B1 | 7/2003 | Smith et al. ................... 701/1 |
| 6,587,835 B1 | 7/2003 | Treyz .......................... 705/14 |
| 6,601,759 B2 | 8/2003 | Fife et al. ................... 235/375 |
| 6,616,047 B2 | 9/2003 | Catan .................... 235/472.02 |
| 6,640,253 B2 | 10/2003 | Schaefer ..................... 709/248 |
| 6,649,403 B1 | 11/2003 | McDevitt et al. ........ 435/288.5 |
| 6,664,897 B2 | 12/2003 | Pate et al. ............... 340/573.3 |
| 6,671,358 B1 | 12/2003 | Seidman et al. ......... 379/93.12 |
| 6,676,014 B2 | 1/2004 | Catan .......................... 235/375 |
| 6,711,617 B1 | 3/2004 | Bantz et al. ................ 709/227 |
| 6,713,298 B2 | 3/2004 | McDevitt et al. ........ 435/287.8 |
| 6,720,920 B2 | 4/2004 | Breed et al. ................ 342/386 |
| 2004/0069850 A1 * | 4/2004 | De Wilde ................... 235/385 |
| 2004/0203352 A1 * | 10/2004 | Hall et al. ................. 455/41.1 |
| 2004/0233054 A1 * | 11/2004 | Neff et al. ............... 340/539.1 |
| 2004/0267395 A1 * | 12/2004 | Discenzo et al. ............. 700/99 |
| 2005/0087235 A1 * | 4/2005 | Skorpik et al. ............. 137/554 |

* cited by examiner

*Primary Examiner*—Brian Zimmerman
(74) *Attorney, Agent, or Firm*—Baker Botts L.L.P.

(57) ABSTRACT

A method and apparatus for RF access to system identification and fault information includes storing system information in a computer component forming a part of an information handling system, receiving a request for at least a portion of the system information via a radio frequency identification ("RF") transponder link, and automatically transmitting a response from the computer component via the RFID transponder link such that the response includes the portion of the system information.

21 Claims, 3 Drawing Sheets

METHOD AND APPARATUS FOR RF ACCESS TO SYSTEM ID AND FAULT INFORMATION

TECHNICAL FIELD

The present disclosure relates generally to information handling systems and, more particularly, to a method and apparatus for radio frequency ("RF") access to system identification and fault information.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A server is one example of an information handling system. Typically, the server is constructed from several computer components. Each component may include a nine to twelve digit manufacturer identification number such as a piece part identification number ("PPID"). The PPID may be used to indicate where and when the component was manufactured. The PPID may also include the component serial number that defines the component. Generally, the PPID is stamped or labeled on each component such that a person must physically read the number.

During a fault or system error in the server, it is possible that one or more of the computer components may need to be removed and replaced. Because a service person such as a field repair technician will have to diagnosis the server error, the technician is typically in physical contact with the server. As such, the technician generally has to test different components to determine the faulty components.

In addition, the technician may not have the correct component to replace the faulty component. Thus, the technician may have to attain the correct component before returning to the server causing a subsequent service call and longer service downtime.

To aid in determining the server error, the technician may use an error log to diagnosis the problem with server. Because the error log is stored in a Baseboard Management Controller (BMC) resident on the server, the technician may be able to access the log directly from the server. However, if the error caused the server to become non-functional (i.e., crash), the technician may be able to view the log using a physical connection to the server. In some cases, the server may need to be removed and returned to a service center to diagnosis the error.

SUMMARY

Thus, a need has arisen for method and apparatus for RF access to system identification (ID) and fault information.

In accordance with teachings of the present disclosure, in one embodiment, the present disclosure teaches a method of accessing system information in an information handling system including storing system information in a computer component forming a part of an information handling system. The method further includes receiving a request for at least a portion of the system information via a radio frequency identification ("RF") transponder link. The method further includes automatically transmitting a response from the computer component via the RFID transponder link such that the response includes at least a portion of the system information.

In other embodiments, an information handling system includes a processor and a memory communicatively coupled to the processor. The information handling system further includes a controller communicatively coupled to the processor via a system bus. The controller is operable to access system information of the information handling system. The information handling system further includes a radio frequency identification ("RFID") transponder coupled to the controller via a communication bus. The RFID transponder is operable to interface with the controller to obtain at least a portion of the system information.

In further embodiments, a system for using a radio frequency ("RF") link to access system information in an information handling system includes a radio frequency identification ("RFID") transponder associated with a computer component forming a part of the information handling system. The RFID transponder is operable to receive a request for system information and to transmit a response based on the request. The system further includes a controller coupled to the RFID transponder via a bus. The controller is operable to dynamically access and to cause the system information to be stored in the information handling system. The system further includes an RF reader detached from the information handling system. The RF reader is operable to transmit the request for system information and to receive the response via a wireless RF signal with the RFID transponder.

Important technical advantages of certain embodiments of the present invention include a method of diagnosing errors in an information handling system. Because system information may include hardware fault codes or error codes, the RF transponder allows a user to access these codes to aid in diagnosing the error.

Another important technical advantage of certain embodiments of the present invention includes less frequent return service calls due to remote access of fault codes. Generally, a service technician must physically access an information handling system to determine which faulty component needs replacement. By remotely accessing the system information, fault codes may be used to determine the faulty component. Additionally, since the system information may include serial and model numbers, the service technician may be able to bring the correct replacement component without having to make a second repair call.

Yet another important technical advantage of certain embodiments of the present invention includes accessing system information while the information handling system or computer component is powered down. Because the system information available to the RFID transponder may be dynamically updated, a RF reader may be able to access the last stored information such as fault codes. Because the RFID transponder can transmit a response despite the information handling system being powered down or off, the system information will be accessible.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
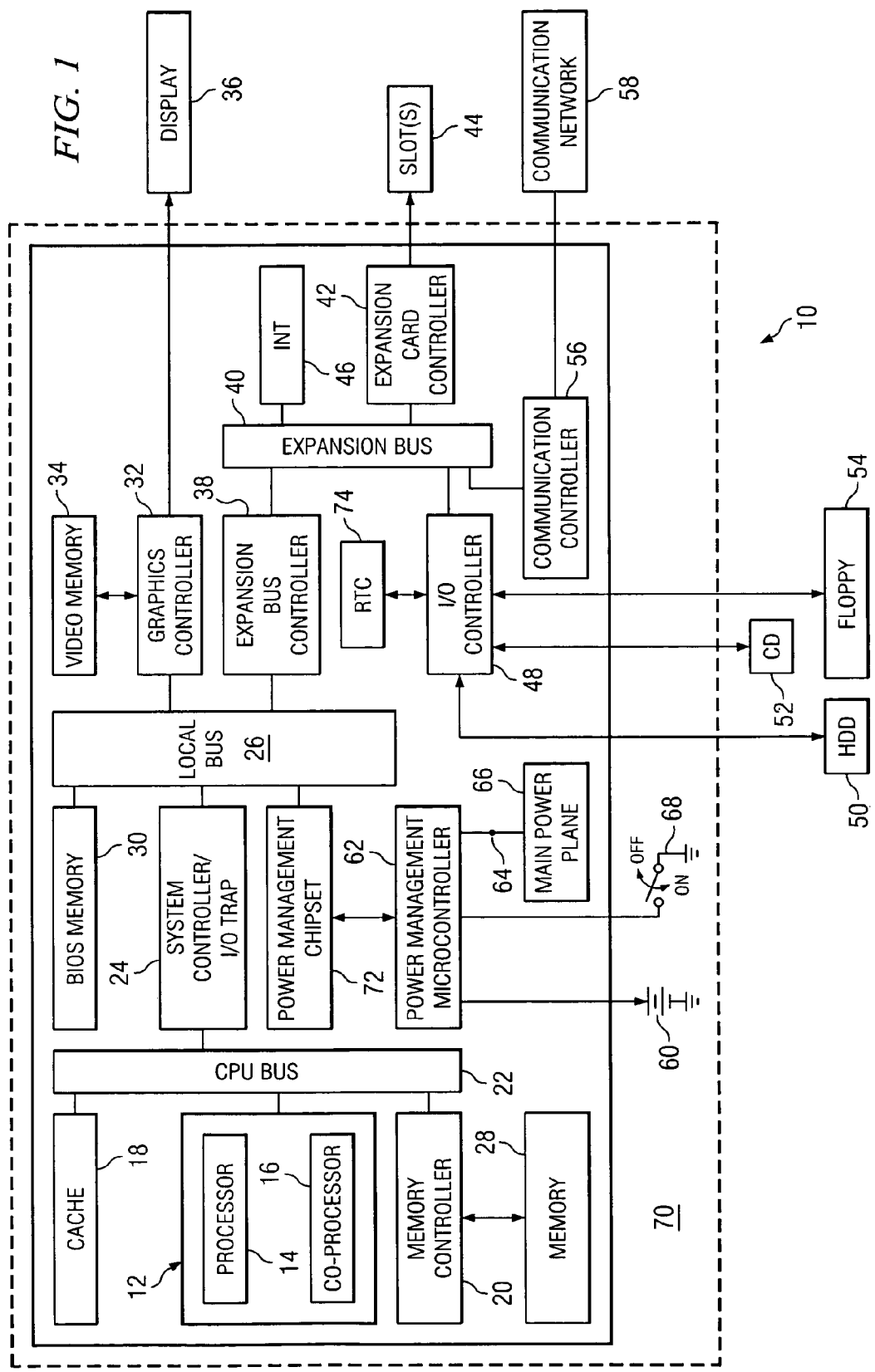
FIG. 1 is a block diagram showing an information handling system, according to teachings of the present disclosure.

Referring first to FIG. 1, a block diagram of information handling system 10 is shown, according to teachings of the present disclosure. Information handling system 10 or computer system preferably includes at least one microprocessor or central processing unit (CPU) 12. CPU 12 may include processor 14 for handling integer operations and coprocessor 16 for handling floating point operations. CPU 12 is preferably coupled to cache 18 and memory controller 20 via CPU bus 22. System controller I/O trap 24 preferably couples CPU bus 22 to local bus 26 and may be generally characterized as part of a system controller.

Main memory 28 of dynamic random access memory (DRAM) modules is preferably coupled to CPU bus 22 by a memory controller 20. Main memory 28 may be divided into one or more areas such as system management mode (SMM) memory area (not expressly shown).

Basic input/output system (BIOS) memory 30 is also preferably coupled to local bus 26. FLASH memory or other nonvolatile memory may be used as BIOS memory 30. A BIOS program (not expressly shown) is typically stored in BIOS memory 30. The BIOS program preferably includes software which facilitates interaction with and between information handling system 10 devices such as a keyboard (not expressly shown), a mouse (not expressly shown), or one or more I/O devices. BIOS memory 30 may also store system code (note expressly shown) operable to control a plurality of basic information handling system 10 operations.

Graphics controller 32 is preferably coupled to local bus 26 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Bus interface controller or expansion bus controller 38 preferably couples local bus 26 to expansion bus 40. In one embodiment, expansion bus 40 may be configured as an Industry Standard Architecture ("ISA") bus. Other buses, for example, a Peripheral Component Interconnect ("PCI") bus, may also be used.

In certain information handling system embodiments, expansion card controller 42 may also be included and is preferably coupled to expansion bus 40 as shown. Expansion card controller 42 is preferably coupled to a plurality of information handling system expansion slots 44. Expansion slots 44 may be configured to receive one or more computer components 80 (shown below in more detail) such as an expansion card (e.g., modems, fax cards, communications cards, and other input/output (I/O) devices).

Interrupt request generator 46 is also preferably coupled to expansion bus 40. Interrupt request generator 46 is preferably operable to issue an interrupt service request over a predetermined interrupt request line in response to receipt of a request to issue interrupt instruction from CPU 12.

I/O controller 48, often referred to as a super I/O controller, is also preferably coupled to expansion bus 40. I/O controller 48 preferably interfaces to an integrated drive electronics (IDE) hard drive device (HDD) 50, CD-ROM (compact disk-read only memory) drive 52 and/or a floppy disk drive (FDD) 54. Other disk drive devices (not expressly shown) which may be interfaced to the I/O controller include a removable hard drive, a zip drive, a CD-RW (compact disk-read/write) drive, and a CD-DVD (compact disk-digital versatile disk) drive.

Communication controller 56 is preferably provided and enables information handling system 10 to communicate with communication network 58, e.g., an Ethernet network. Communication network 58 may include a local area network (LAN), wide area network (WAN), Internet, Intranet, wireless broadband or the like. Communication controller 56 may be employed to form a network interface for communicating with other information handling systems (not expressly shown) coupled to communication network 58.

As illustrated, information handling system 10 preferably includes power supply 60, which provides power to the many components and/or devices that form information handling system 10. Power supply 60 may be a rechargeable battery, such as a nickel metal hydride ("NiMH") or lithium ion battery, when information handling system 10 is embodied as a portable or notebook computer, an A/C (alternating current) power source, an uninterruptible power supply (UPS) or other power source.

Power supply 60 is preferably coupled to power management microcontroller 62. Power management microcontroller 62 preferably controls the distribution of power from power supply 60. More specifically, power management microcontroller 62 preferably includes power output 64 coupled to main power plane 66 which may supply power to CPU 12 as well as other information handling system components. Power management microcontroller 62 may also be coupled to a power plane (not expressly shown) operable to supply power to an integrated panel display (not expressly shown), as well as to additional power delivery planes preferably included in information handling system 10.

Power management microcontroller 62 preferably monitors a charge level of an attached battery or UPS to determine when and when not to charge the battery or UPS. Power management microcontroller 62 is preferably also coupled to main power switch 68, which the user may actuate to turn information handling system 10 on and off. While power management microcontroller 62 powers down one or more portions or components of information handling system 10, e.g., CPU 12, display 36, or HDD 50, etc., when not in use to conserve power, power management microcontroller 62 itself is preferably substantially always coupled to a source of power, preferably power supply 60.

Computer system, a type of information handling system 10, may also include power management chip set 72. Power management chip set 72 is preferably coupled to CPU 12 via local bus 26 so that power management chip set 72 may receive power management and control commands from CPU 12. Power management chip set 72 is preferably connected to a plurality of individual power planes operable to supply power to respective components of information handling system 10, e.g., HDD 50, FDD 54, etc. In this manner, power management chip set 72 preferably acts under the direction of CPU 12 to control the power supplied to the various power planes and components of a system.

Real-time clock (RTC) 74 may also be coupled to I/O controller 48 and power management chip set 72. Inclusion of RTC 74 permits timed events or alarms to be transmitted to power management chip set 72. Real-time clock 74 may be programmed to generate an alarm signal at a predetermined time as well as to perform other operations.

Figure 2:
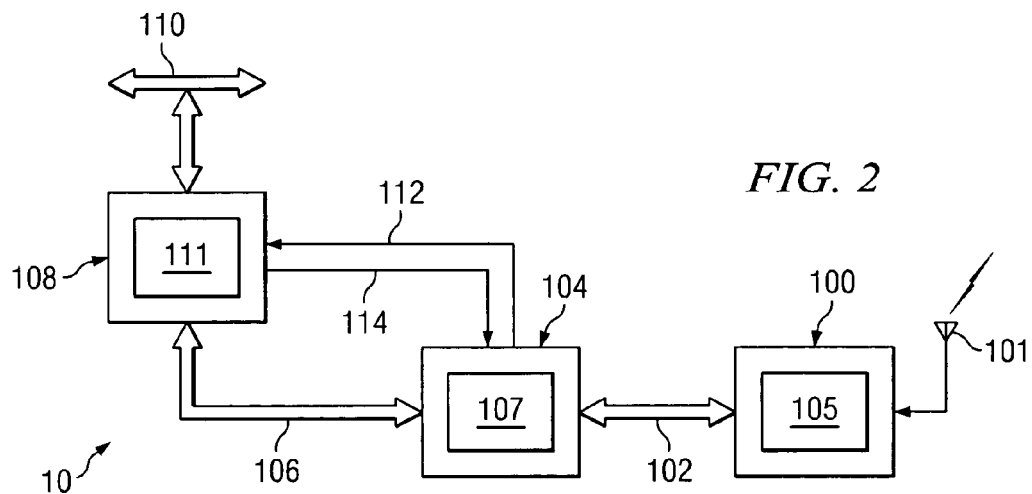
FIG. 2 is a block diagram showing a system for accessing system information using a radio frequency identification ("RFID") transponder in the information handling system, according to teachings of the present disclosure.

FIG. 2 is a block diagram showing a system for accessing system information using radio frequency identification ("RFID") transponder 100 in information handling system 10. RFID transponder 100 may store information into a non-volatile storage medium, such as an electrically erasable programmable read-only memory ("EEPROM") portion of the transponder such that the stored information may be accessed without electrical power to information handling system 10. RFID transponder 100 generally receives requests and transmits information external to information handling system via antenna 101. Antenna 101 usually forms a part of RFID transponder 100 such that information such as system information may be transmitted from RFID transponder 100 to a receiving device. In some embodiments, RFID transponder 100 includes memory 105 such as EEPROM that stores system information accessible via the link with RFID transponder 100.

Typically, system information includes piece part identification (PPID) numbers and system fault information. Given a PPID number, the model and serial number of a system component may be deciphered such that a replacement component is determined. System fault information generally includes fault codes and/or system failure codes.

Generally, RFID transponder 100 is coupled to computer programmable logic device ("CPLD") 104 via bus 102. CPLD 104 may include programming or logic to translate a request from an external device into another format or computer language that can be recognized by information handling system 10. Typically, CPLD 104 uses programmable logic to process or modify the request into the correct format such as a buffer program. In some instances, system information and/or the buffer program are stored in memory 107.

In a further embodiment, CPLD 104 buffers the request such that a password in the request is decoded for authentication to allow a user access to the system information. In one instance, the password is compared with the information stored in memory 105, 107 or 111 to allow access to the system information. CPLD 104 is typically communicatively coupled to controller 108 via management bus 106 such that request are relayed, whether processed or not, to controller 108 such as a baseboard management controller.

Although CPLD 104 may relay request and system information between RFID transponder 100 and controller 108 via management bus 106, CPLD 104 may also communicate along separate interfaces. For example, first side band signal 112 may be sent directly from CPLD 104 to controller 108 such that an error code is returned via second side band signal 114. In some instances, the returned error code is for the last fault occurrence. As such, a fault indication may be stored in CPLD 104 or memory 107.

Controller 108 is typically communicatively coupled to information handling system 10 via system bus 110. Controller 108 may include memory 111 to store system information. Being coupled to information handling system 10, controller 108 is about to access a variety of system information including system status and fault events including those stored in basic input/output system ("BIOS") via an interface (not shown).

Figure 3:
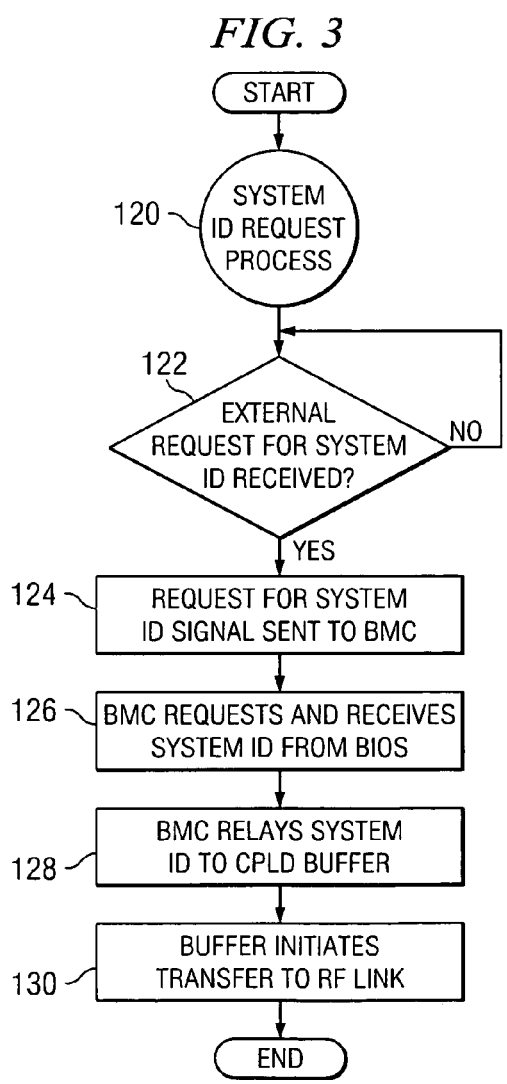
FIG. 3 is a flowchart depicting accessing a system identification using a radio frequency ("RF") link, according to an example embodiment of the present disclosure.

FIG. 3 is a flowchart illustrating a method of accessing system identification ("system ID") using a radio frequency ("RF") link. Typically, the system ID includes the PPID for each component in information handling system 10. In one embodiment of the present disclosure, RFID transponder 100 uses a radio frequency ("RF") link to return system ID to an external device.

At block 120, a process for requesting the system ID is initiated at an external device. The external device sends a RF signal to RFID transponder 100 to establish an RF link. RFID transponder 100 may be waiting for the system ID request, at block 122. Once the request has been received, the request may be sent to controller 108 such as a baseboard management controller ("BMC") at block 124. In some instances, the request may be processed and relayed through a buffer in CPLD 104, such as a CPLD buffer prior to being sent to controller 108.

At block 126, controller 108 request the system ID from the BIOS, which supplies the system ID located in a BIOS accessible memory store. After receiving the system ID from the BIOS, controller 108 relays the system ID to the CPLD buffer at block 128. Once received, the CPLD buffer may initiate a response RF signal to the external device via the RF link at block 130.

Figure 4:
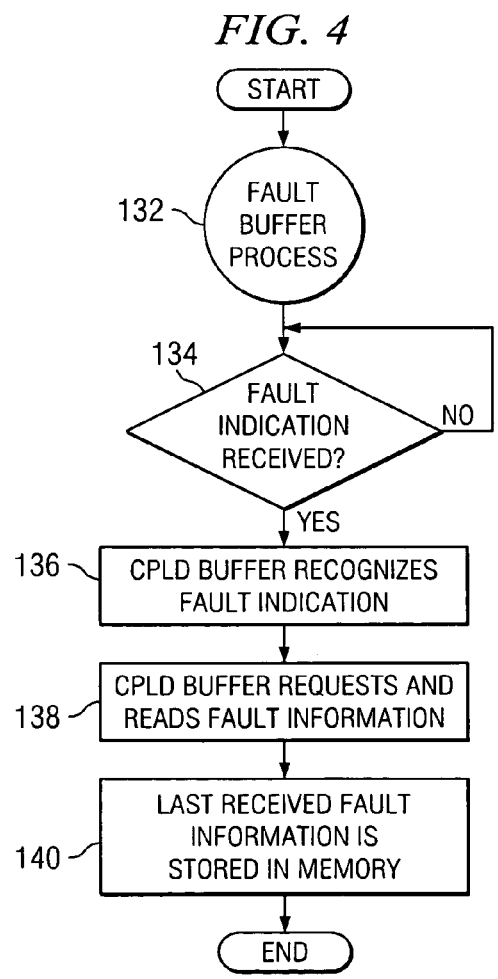
FIG. 4 is a flowchart depicting storing a fault indication in memory, according to an example embodiment of the present disclosure.

FIG. 4 is a flowchart illustrating a method of storing a fault indication in memory 105, 107 or 111. Generally, when a problem or fault occurs in information handling system 10, fault information, which may include fault indications, is generated. The generated fault indication alerts CPLD 104 of fault in information handling system 10 in which case CPLD 104 will expect fault information to become available. Typically, the fault indications are sent along system bus 110 and received at controller 108. At block 132, a fault buffer process may be initiated. At block 134, the process waits for fault indication to be received. Once received, controller 108 may store the fault indication and notify a CPLD buffer that an indication has been received.

At block 136, the CPLD buffer may recognize the indication as a fault indication. And, at block 138, the CPLD buffer may request the fault information from controller 108 such that the fault information is read by the CPLD buffer. In some instances, CPLD 104 may send the request to controller 108 via first side band signal 112 and received fault indication from controller 108 via second side band signal 114.

At block 140, CPLD buffer may cause the fault information to be saved in CPLD 104. Typically, fault information is dynamically stored such that the last fault information is the first indication read. Since fault information may aid in diagnosing problems with information handling system 10, the most recent fault information usually provides a better clue as to the problem. In some instances, fault information is stored in memory 107.

Figure 5:
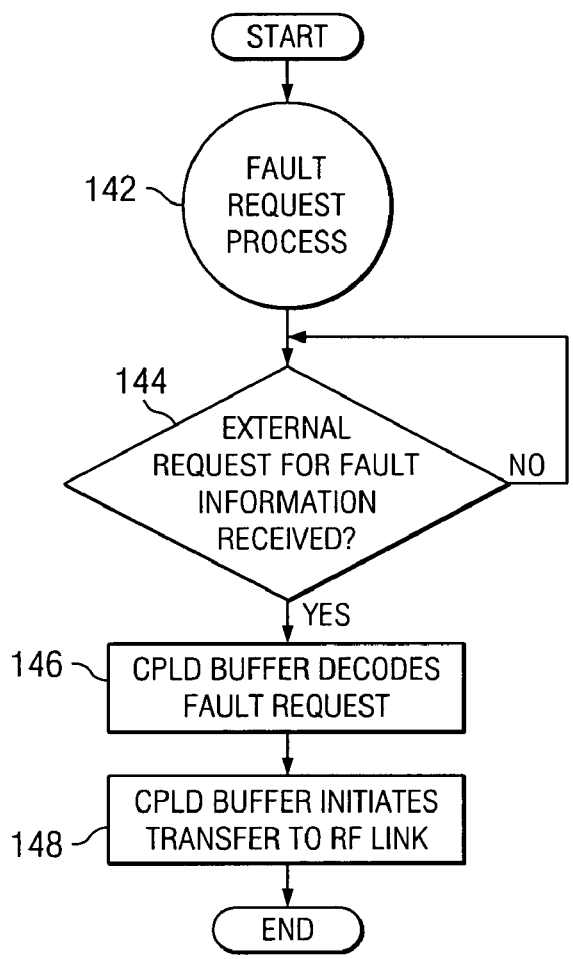
FIG. 5 is a flowchart for accessing fault information using a RF link, according to an example embodiment of the present disclosure.

FIG. 5 is a flowchart for accessing fault information using a RF link. Once the fault information is stored in CPLD 104 such as in memory 107, a fault request process may be used to access the fault information using the RF link initiated from an external device at block 142. Typically at the request of a user, an external device generates a RF signal that is received at RFID transponder 100 via antenna 101; however the request may also be an automated request in lieu of a user driven request. At block 144, RFID transponder receives the fault request via the RF link and proceeds to forward the fault request to CPLD 104.

At block 146, CPLD 104 may decode the fault request via CPLD buffer such that controller 108 is able to read the request. For example, the request may be generated according to a different software protocol but after being decoded, firmware or software operating in controller 108 may be able to recognize and understand the request. In other embodiments, CPLD 104 may decode a password in the request such that only authorized users are permitted access to fault information or indications.

At block 148, the fault information has been retrieved and may be forwarded back to the external device or some other receiving device via the RF link. Typically, the last fault information stored in memory 107 may be sent in a response signal to the external device via the RF link.

Figure 6:
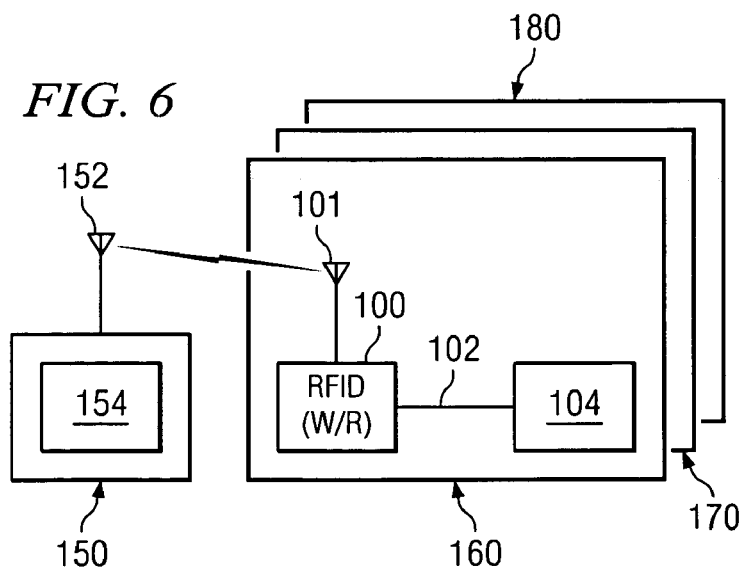
FIG. 6 illustrates an example embodiment of a RF reader used to access system information from a computer module, according to an example embodiment of the present disclosure.

FIG. 6 illustrates an example embodiment of radio frequency ("RF") reader used to access system information from field replaceable units such as computer module 160, 170 and 180. When diagnosing problems in one or more components of information handling system 10, a technician may be able to replace several computer components, such as computer modules 160, 170, and 180, in information handling system 10. With computer modules 160, 170 and 180 replaced, the technician may be able to return to a service bench for testing. Despite the fact that computer modules 160, 170 and 180 are removed from a power source, RF transmit/receive device 150 may be able to access system information from computer modules 160, 170 and 180.

Computer modules 160, 170 and 180 may include RFID transponder 100 with antenna 101. RFID transponder 100 may be coupled to CPLD 104 via bus 102. Because RFID transponder 100 may use an EEPROM to store information, the information may be accessed in a non-invasive manner such that power to computer modules 160, 170 and 180 is not required. In addition to storing system information, EEPROM may further store a password to limit access to the system information to authorized users.

RF transmit/receive device 150 may be a hand held device or may form a portion of a service bench that is able send an RF signal. RF transmit/receive device 150 may include RF antenna 152 and display 154. In some instances, RF transmit/receive device 150 may be capable of running a client application to translate system information into a "user-friendly" output. In further embodiments, users may view the "user friendly" text equivalent output on display 154. As such, system information from computer modules 160, 170 and 180 may be retrieved without physically touching any part of information handling system 10.

Although the disclosed embodiments have been described in detail, it should be understood that various changes, substitutions and alterations can be made to the embodiments without departing from their spirit and scope.

What is claimed is:

1. A method of accessing system information in an information handling system, comprising:
storing system information in a computer component forming a part of an information handling system, wherein the computer component comprises a baseboard management controller (BMC);
receiving a request for at least a portion of the system information via a radio frequency identification ("RFID") transponder link;
after receiving the relayed request, the BMC retrieving the requested system information from a basic input/output system (BIOS) memory of the information handling system via a system bus; and
automatically transmitting a response from the computer component via the RFID transponder link such that the response includes the at least a portion of the retrieved system information.

2. The method of claim 1, further comprising automatically processing and relaying the request through a computer programmable logic device ("CPLD") buffer to the computer component in the information handling system via a bus.

3. The method of claim 1, further comprising dynamically updating the stored system information in the information handling system.

4. The method of claim 1, wherein the BMC is resident on the information handling system and coupled to a central processing unit (CPU) of the information handling system via a system.

5. The method of claim 1, further comprising storing a portion of the system information in a memory associated with the RFID transponder link.

6. The method of claim 5, wherein the system information stored in the memory includes a current system fault event.

7. The method of claim 1, further comprising diagnosing a failure in the information handling system based on the response even if the information handling system is powered down.

8. The method of claim 1, wherein receiving the request further comprises decoding a password included with the request, the password operable to prevent the transmission of the response such that only authorized users may receive the response.

9. An information handling system comprising:
 a processor;
 a memory communicatively coupled to the processor;
 a controller communicatively coupled to the processor via a system bus, the controller operable to access system information of the information handling system; and
 a radio frequency identification ("RFID") transponder coupled to the controller via a communication bus, the RFID transponder operable to interface with the controller to obtain at least a portion of the system information.

10. The information handling system of claim 9, further comprising a computer programmable logic device ("CPLD") buffer coupled between the RFID transponder and the controller, the CPLD buffer operable to process a request for a portion of the system information received at the RFID transponder and relay the request to the controller.

11. The information handling system of claim 10, wherein the request includes a password operable to be decoded by the information handling system such that access to the system information is permitting.

12. The information handling system of claim 9, wherein the system information include system identification and system fault events.

13. The information handling system of claim 12, wherein the system fault events comprise a system event log.

14. The information handling system of claim 12, wherein the system identification comprises a piece part identification ("PPID") number.

15. The information handling system of claim 9, further comprising decoding the request with the CPLD buffer.

16. The information handling system of claim 9, wherein the request further comprises system commands for the information handling system.

17. The information handling system of claim 16, wherein the system commands includes a reset command.

18. A system for using a radio frequency ("RF") link to access system information in an information handling system, comprising:
 a radio frequency identification ("RFID") transponder forming a part of the information handling system, the RFID transponder operable to receive a request for system information and to transmit a response based on the request;
 a controller coupled to the RFID transponder via a bus, the controller operable to dynamically access and to cause the system information to be stored in the information handling system;
 an RF reader detached from the information handling system, the RF reader operable to transmit the request for system information and to receive the response via a wireless RF signal with the RFID transponder; and
 wherein the controller is a baseboard management controller of the information handling system.

19. The system of claim 18, further comprising a computer programmable logic device (CPLD) buffer operably coupled between the controller and the RFID transponder, the CPLD buffer operable to access the system information via a management bus coupled to the controller such that system information is made available to the RFID transponder for access by a user.

20. The system of claim 18, further comprising:
 a password supplied by a user, the password is sent from the RF reader via the wireless RF signal and received by the RFID transponder; and
 the password operable to permit the user to access the system information.

21. The system of claim 18, wherein the RF reader further comprises a display operable to provide a "user-friendly" output.

* * * * *